Sept. 10, 1940.  G. SIFKOVITZ  2,213,999
PACKLESS VALVE ASSEMBLY
Original Filed Sept. 12, 1936
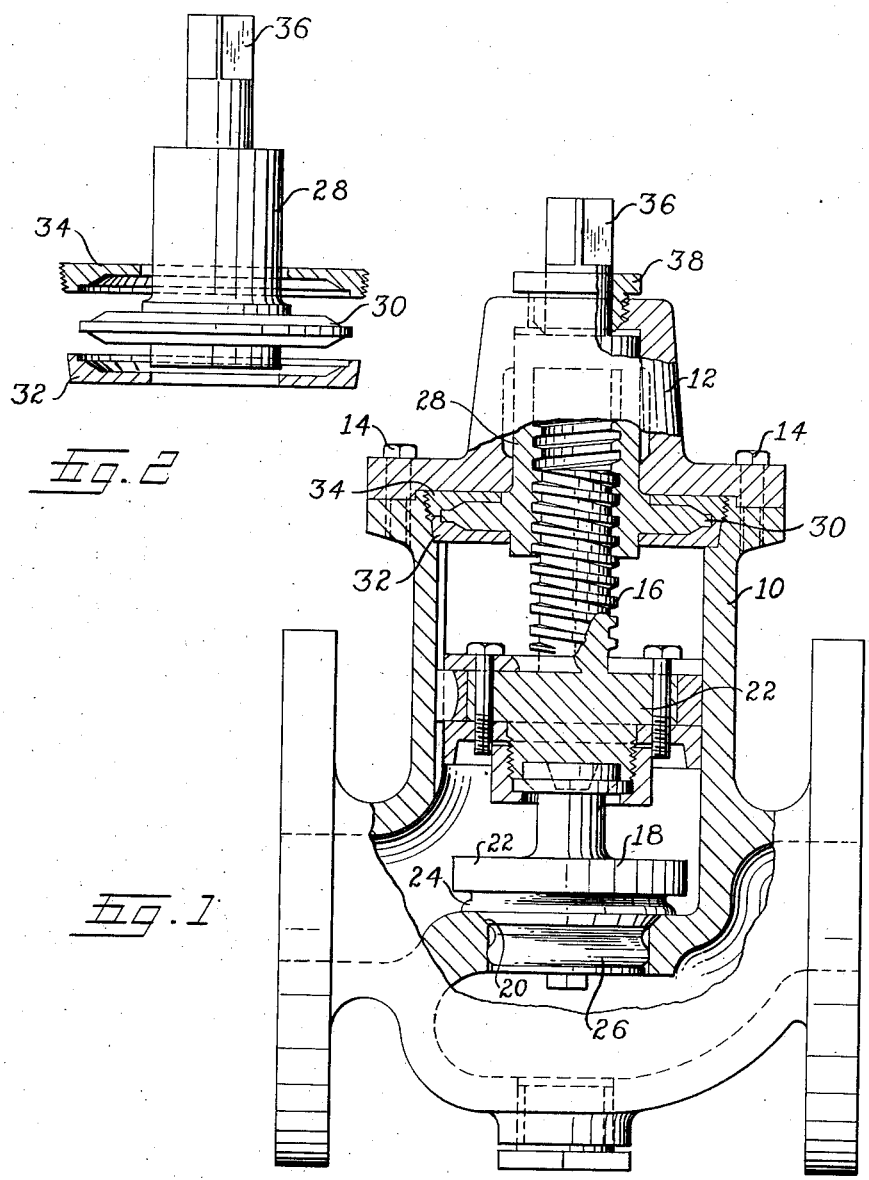
INVENTOR.
GEORGE SIFKOVITZ
BY Parker & Burton
ATTORNEYS.

Patented Sept. 10, 1940

2,213,999

UNITED STATES PATENT OFFICE 2,213,999

PACKLESS VALVE ASSEMBLY

George Sifkovitz, Saegertown, Pa., assignor to The George Valve Company, Saegertown, Pa., a corporation of Delaware Original application September 12, 1936, Serial No. 100,487. Divided and this application June 3, 1938, Serial No. 211,507

5 Claims. (Cl. 251—50)

This invention relates to valves and particularly to a packless valve assembly. This application forms divisional subject matter of my copending application, Serial No. 100,487, filed September 12, 1936.

An important object of this invention is to provide a packless structure for valves which is adapted to withstand high fluid pressures in the valve body and yet will allow movement of parts without leakage. More specifically, this invention comprehends a packless metal ring assembly through which a rotating element of the valve operating mechanism is movable. The assembly is constructed in a novel manner to reduce the effect of the fluid pressure on the sliding contacting surfaces and allowing constant freedom of movement irrespective of the amount or the variation in the fluid pressure. In addition, novel means is provided for varying the pressure at which the contacting faces of the assembly engage one another so that adjustment for wear can be easily made. Fluid sealed contact between the metal parts in the metal ring assembly is obtained by providing smooth precisely finished faces on these parts preferably formed by machine finishing the faces.

An important feature of the invention is the provision of a novel valve adjuster or compensator which forms an adjustable but leak-proof structure assisting the packless metal ring assembly in sealing the valve. The compensator extends through the valve body where it may be easily regulated from the outside of the valve.

Various other objects, advantages and meritorious features of the invention will become more fully apparent from the following specification, appended claims, and accompanying drawing wherein:

Figure 1 is a vertical section through a valve structure illustrating one embodiment of the invention, and Fig. 2 is an exploded view illustrating the parts of the packless metal ring assembly and the manner of assembling the same together.

Referring to Fig. 1, the packless valve structure illustrated therein is shown associated with a globe type of valve but it is understood that the invention is readily adaptable to other types of valves. In Fig. 1, the body of the globe valve is indicated at 10. It is opened at one end and a cap or bonnet 12 is removably secured thereto by bolts 14. Extending longitudinally through the valve body is a valve stem member 16 carrying a valve head 18 adapted to engage a valve seat 20 and close the valve. The valve stem is enlarged at 22 and novel means described and claimed in my copending application, Serial No. 211,508, filed June 3, 1938, is associated with this enlarged end for frictionally retarding the rotation of the valve stem. Connecting the valve head 18 to the valve stem 16 is a novel swivel joint assembly also described and claimed in the aforesaid copending application.

The valve head carries novel seat wiping and protecting elements 24 and 26 similar to those described and claimed in my copending application, Serial No. 100,487, of which this application forms a division. These elements are flexible and will spread apart and expose the valve seating parts as the valve head approaches the valve seat.

The valve stem 16 is externally threaded as shown. It is threaded to a surrounding internally threaded operating member 28 of cup-shaped formation. This member rotates in the valve body and when relative rotation occurs between it and the valve stem it will cause the latter to advance toward or away from the valve seat depending upon which direction the member is rotated. The frictional retarding means referred to above, associated with the enlarged section 22, will restrain rotation of the valve stem until the valve head or the opposite end of the valve stem abut respectively the valve seat or the closed upper end of member 28 with a force greater than the frictional resistance of the retarding means. When this occurs, the valve stem will resistingly rotate with the operating member 28 and further advance of the valve head is precluded.

The packless structure which forms the feature claimed herein is shown associated with the rotatable operating member 28. It is understood, however, that this structure may be associated with other movable or stationary parts in a valve assembly and may be modified for use in other types of valves. Referring to the drawing, the rotatable operating member 28 is provided with a radial flange or rim 30 which extends to substantially the inner wall of the valve body. The flange is preferably designed with circular inclined faces on the opposite sides thereof. These inclined faces are machine finished to provide ground joints as will be more fully pointed out hereinbelow.

A fluid tight seal is provided about the flange 30 by means which contacts the inclined faces of the flange and is machine finished for this purpose. This means comprises, as shown, a pair of ring-shaped members or washers 32 and 34 embracing the outer edge of the flange therebetween. The inner wall of the valve body is recessed back to provide a shoulder for receiving and supporting the member 32. The other member 34 is threaded to the valve body above this shoulder as shown. When fully threaded, the outer margin of member 34 will abut the outer margin of member 32.

The inner faces of these ring-shaped members 32 and 34 are provided with circular inclined surfaces adapted to bear upon the inclined faces on the flange 30 of the operating member. These inclined surfaces are machine finished for close fit with the inclined faces of the flange and when bearing thereupon form a pair of ground joints sealing the rotating member 28. The compression with which the flange is gripped by these members or washers may be varied by adjusting the threaded engagement of member 34. As wear takes place, slight adjustments of this nature may be found to be desirable. Furthermore, adjustment of member 34 will vary the resistance of the operating member 28 to the turning forces applied thereto. If desired, washer 32 may be threaded to the valve body like washer 34 particularly in those cases where the valve is subjected to high fluid pressures. The bonnet 12 when secured to the valve body bears upon the washer 34 and locks the same in adjusted position.

An important feature of this completely metal fluid tight seal is the ability of one of the parts of the seal to move or rotate relative to the others without impairing the sealing qualities in any respect. In addition, the seal is constructed in a novel way to prevent the pressure of the fluid in the valve from affecting the turning or rotating movements of any member of the seal. This is true of the operating member 28 in the present embodiment of the invention. If a fluid under high pressure is admitted to the valve, part of it will escape, in valves of the kind illustrated, into the chamber housing the operating mechanism and affect the movement of the parts.

In the illustrated embodiment of the invention, if the flange 30 is to any extent exposed to the pressure of this fluid in the valve, this fluid will tend to lift operating member 28 and press the same against the valve body and the upper ring-shaped member 34 with such a force that it will increase the resistance of the operating member to turning movement and make it difficult if not impossible in certain instances to turn the operating member 28. This possibility is automatically remedied by extending the washer 32 radially inward until the greater portion of the area of the flange 30 is protected from the fluid pressure. By covering the exposed parts of the opering member in this way, the pressure of the fluid is prevented from affecting the movement of the operating member and it may be easily rotated at all times. The pressure of the fluid in the valve is received by the washer 32 which in turn transmits it to the valve body. In this respect, the assembly 30, 32 and 34 not only functions to provide a packless fluid-tight seal but also to allow relative movement of the parts while protecting the same from the pressure of the fluid in the valve.

The top of the operating member 28 is provided with a shank 36 which extends through a central hole in the bonnet 12. The exterior end section of this shank is shaped to receive any suitable form of operating appliance for turning the member 28. Surrounding the shank is a compensating nut or gland 38 threaded to the bonnet. This nut serves as an auxiliary leak-proof structure. The nut bears upon the upper end of the operating member 28 and threaded adjustment thereof will vary the resistance of the operating member to turning movements. This compensating nut, in addition, acts to hold the operating member against longitudinal movement as a result of its action upon the valve stem member 16.

What I claim:

1. A packless valve assembly comprising, in combination, a casing having a cylindrical wall, a removable cap secured to one end of said casing, a member rotatable in said cap having a radial flange extending laterally therefrom to adjacent the inner surface of the wall of said casing, a ring-shaped member contacting one side of said radial flange, a ring-shaped member likewise contacting the other side of said radial flange, said flange and said ring-shaped members having contacting finished surfaces adapted to prevent the passage of fluid thereby but to permit rotation of said flange relative to said ring-shaped members, and means adjustably securing said ring-shaped members to the wall of said casing and adapted upon adjustment to vary the compression with which said ring-shaped members grip said radial flange.

2. A packless valve assembly comprising, in combination, a valve body, a ring-shaped member supported by said valve body and extending radially inwardly thereof, a rotatable valve operating part having a radial flange supported upon said ring-shaped member, a second ring-shaped member bearing upon the top side of said radial flange, the contacting surfaces of said radial flange and said ring-shaped member being machine finished to provide fluid tight ground joints between the parts, one of said ring-shaped members being threaded to the valve body for adjustment toward and away from the other member to vary the degree of compression with which said members grip said radial flange, and means for exerting pressure in an axial direction upon said threaded member to lock the same in adjusted position.

3. A packless valve assembly comprising in combination, a valve body opened at one end, a bonnet removably secured to said body for covering said opening, a rotatable valve operating member in said body having a radially extending flange, said body provided with an inner circular shoulder adjacent its opened end, a ring-shaped member seated on said shoulder and adapted to form a support upon which the radial flange of said rotatable operating member bears, a second ring-shaped member superimposing the radial flange of said operating member and threaded to said valve body for adjustment upon said radial flange, the contacting faces of said radial flange and said ring-shaped members being machine finished to form ground joints between the parts, said bonnet bearing upon the superimposing ring-shaped member and locking the same in adjusted position.

4. The invention described in claim 3 characterized by the fact that the rotatable valve operating member has an operating shank extending through said bonnet to the outside of the valve assembly, and that a nut on said shank is threaded to the bonnet and bears on the upper end of the operating member whereby upon adjustment the nut will vary the resistance of the operating member to rotation.

5. A packless valve assembly comprising, in combination, a valve body, a rotatable member in said valve body having a radial flange extending laterally toward the wall of the valve body, said radial flange having radially extending ground surfaces separated by inclined ground surfaces on the opposite sides thereof, a pair of ring-shaped members secured to said wall of the valve body and extending inwardly thereof and embracing said radial flange on opposite sides thereof, the inner surfaces of said members provided with radially extending ground surfaces and inclined ground surfaces corresponding to those on said flange and contacting the ground surfaces of the latter to form a fluid seal while permitting rotation of said flange therethrough.

GEORGE SIFKOVITZ.